US006272196B1

(12) United States Patent
Wuppermann et al.

(10) Patent No.: US 6,272,196 B1
(45) **Date of Patent: *Aug. 7, 2001**

(54) ENCODER USING AN EXCITATION SEQUENCE AND A RESIDUAL EXCITATION SEQUENCE

(75) Inventors: Friedhelm Wuppermann; Fransiscus M. J. De Bont, both of Eindhoven (NL)

(73) Assignee: U.S. Philips Corporaion, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,686

(22) Filed: Feb. 12, 1997

(30) Foreign Application Priority Data

Feb. 15, 1996 (EP) ........................ 96200371

(51) Int. Cl.[7] ........................ H04L 23/00

(52) U.S. Cl. ........................ 375/377; 704/219

(58) Field of Search ........................ 704/223, 219, 704/262, 264, 220, 221, 222, 216, 208; 375/219, 285, 296, 316, 295, 377

(56) References Cited

U.S. PATENT DOCUMENTS 4,899,385 * 2/1990 Ketchum et al. ........ 381/36
4,932,061 * 6/1990 Kroon et al. ........ 381/30
4,945,567 * 7/1990 Ozawa .
4,964,169 * 10/1990 Ono .
5,127,053 * 6/1992 Koch .
5,138,661 * 8/1992 Zinser et al. ........ 381/35
5,206,884 * 4/1993 Bhaskar .
5,233,660 * 8/1993 Chen ........ 381/38
5,235,670 * 8/1993 Lin et al. .
5,265,167 * 11/1993 Akamine et al. ........ 381/40
5,299,281 * 3/1994 Coolegem ........ 395/2.28
5,327,520 * 7/1994 Chen ........ 395/2.28
5,388,105 2/1995 Takagi et al. ........ 371/37.7
5,451,951 * 9/1995 Elliot et al. ........ 341/155
5,455,888 * 10/1995 Iyengar ........ 395/212

(List continued on next page.)

FOREIGN PATENT DOCUMENTS 6224773A 8/1994 (JP) ........ H03M/7/30

OTHER PUBLICATIONS

"Codebook Searching for 4.8 KBPS CELP Speech Coder", by W. Greider et al in Communications, Computers and Power in the Modern Environment Conference Proceeding, Saskatoon, Canada, May 17–18, 1993, pp. 397–406, IEEE Wescanex 1993.
"Binary Pulse Excitation: A Novel Approach to Low Complexity CELP Coding" by R.A. Salami in the Book "Advances in Speech Coding" pp. 145–156.

*Primary Examiner*—Chi Pham
*Assistant Examiner*—Jean B. Corrielus
(74) *Attorney, Agent, or Firm*—Anne E. Barschall

(57) ABSTRACT

In a CELP coder, a comparison between a target signal and a plurality of synthetic signals is made. A synthetic signal is derived by filtering a plurality of excitation sequences by a synthesis filter having parameters derived from the target signal. The excitation signal, which results in a minimum error between the target signal and the synthetic signal, is selected. The search for the best excitation signal requires a substantial computational complexity. To reduce the complexity, a preselection of a small number of excitation sequences is made by selecting a small number of excitation sequences resembling the most backward filtered target signal. With this small number of excitation sequences a full complexity search is made. Due to the reduced number of excitation sequences involved in the final selection the required computational complexity is reduced.

9 Claims, 4 Drawing Sheets

U.S. PATENT DOCUMENTS 5,481,642 * 1/1996 Shoham .............................. 395/2.28
5,579,433 * 11/1996 Jarvinen .............................. 395/228
5,621,852 * 4/1997 Lin .............................. 395/2.28
5,651,091 * 7/1997 Chen .............................. 395/2.32
5,699,485 * 12/1997 Shoham .............................. 395/2.32
5,724,480 * 3/1998 Yamaura .............................. 395/2.28
5,745,871 * 4/1998 Chen .............................. 704/207
5,787,391 * 7/1998 Moriya et al. .............................. 704/225
5,819,213 * 10/1998 Oshikiri et al. .............................. 704/222
5,867,814 * 2/1999 Yong .............................. 704/216
5,893,061 * 4/1999 Gortz .............................. 704/262

* cited by examiner

ENCODER USING AN EXCITATION SEQUENCE AND A RESIDUAL EXCITATION SEQUENCE

BACKGROUND OF THE INVENTION

The invention is related to a transmission system comprising a transmitter for transmitting an input signal to a receiver via a transmission channel, the transmitter comprising an encoder with an excitation sequence generator for generating a plurality of excitation sequences, selection means for selecting an excitation sequence from a plurality of excitation signals resulting in a minimum error between a synthetic signal derived from said excitation sequence, and a target signal derived from the input signal, the transmitter being arranged for transmitting a signal representing the selected excitation sequence to the receiver, the receiver comprises a decoder with an excitation sequence generator for deriving the selected excitation sequence from the signal representing the selected excitation sequence, and a synthesis filter for deriving a synthetic signal from the excitation sequence.

The present invention is also related to a transmitter, an encoder, a transmission method and an encoding method.

A transmission system according to the preamble is known from the paper "Codebook searching for 4.8 kbps CELP speech coder" by W. Grieder et. al. in Communications, Computers and Power in the Modern Environment Conference proceeding, Saskatoon, Canada, May 17–18, 1993, pp. 397–406, IEEE Wescanex 1993.

Such transmission systems can be used for transmission of speech signals via a transmission medium such as a radio channel, a coaxial cable or an optical fibre. Such transmission systems can also be used for recording of speech signals on a recording medium such as a magnetic tape or disc. Possible applications are automatic answering machines or dictating machines.

In modern speech transmission systems, the speech signals to be transmitted are often coded using the analysis by synthesis technique. In this technique, a synthetic signal is generated by means of a synthesis filter which is excited by a plurality of excitation sequences. The synthetic speech signal is determined for a plurality of excitation sequences, and an error signal representing the error between the synthetic signal, and a target signal derived from the input signal is determined. The excitation sequence resulting in the smallest error is selected and transmitted in coded form to the receiver.

In the receiver, the excitation sequence is recovered, and a synthetic signal is generated by applying the excitation sequence to a synthesis filter. This synthetic signal is a replica of the input signal of the transmitter.

In order to obtain a good quality of signal transmission a large number (e.g. 1024) of excitation sequences are involved with the selection. In the case of speech coding an excitation sequence is in general a segment with a duration of 2–5 ms. In the case of a sample frequency of 16 kHz, this means 32–80 samples. The parameters of the synthesis filter are in general derived from analysis parameters which represent characteristic properties of the input signal. In speech coding the analysis parameters used mostly are so called prediction parameters. The number of prediction parameters can vary from 10 to 50, and consequently the order of the synthesis filter.

Having to compute the synthetic speech signal for all excitation sequences; results in a substantial computational burden.

OBJECTS AND SUMMARY OF THE INVENTION

The object of the present invention is to provide a transmission system according to the preamble in which the computational burden is substantially reduced.

Therefore the transmission system according to the invention is characterised in that the encoder comprises an analysis filter for deriving from the input signal a residual sequence, in that the encoder comprising excitation sequence selection means for selecting from a larger set of excitation sequences the plurality of excitation sequences having the largest resemblance with the residual sequence.

The invention is based on the recognition that the complexity of the transmission system can be substantially reduced by performing a preselection of the possible excitation sequences using a filtered target signal or residual signal. The excitation sequences selected are those that most resemble the filtered target signal (or residual signal). Experiments have shown that it is possible to reduce the complexity of the coder with a factor varying from 20 to 180 without affecting the quality of the selection procedure.

It is observed that the article "Binary pulse excitation: a novel approach to low complexity CELP coding" by R. A. Salami in the book "Advances in Speech Coding" edited by B. Atal, V. Cupermann and A. Gersho, pp. 145–156, Kluwer Academic Publishers, ISBN 0-7923-9091-1 discloses the construction of a local codebook from a larger codebook. However in this document it is not disclosed that the excitation sequences are selected in view of their resemblance to the residual signal, but they are derived from one selected excitation sequence which is regarded as nearly optimal.

An embodiment of the invention is characterised in that the excitation sequences comprise non zero sample values being separated by a predetermined number of zero sample values, and in that the excitation sequence selecting means are arranged for determining from the residual signal the position of the non zero sample values in the plurality of excitation sequences.

Using equidistant pulses separated with a predetermined number of zero values results in a reduced computational complexity for filtering the excitation sequences. By first selecting the position of the non zero samples in the excitation sequences to be considered for further selection, the number of excitation sequences involved in the further selection, is reduced substantially. This leads to a substantial decrease of the required computational complexity.

A further embodiment of the invention is characterised in that the excitation sequences comprises ternary excitation samples, in that the excitation sequence selecting means are arranged for selecting the excitation sequences of which the sign of the signal samples does not differ from the sign of the corresponding samples in the residual sequence Using ternary sample values results in a low computational complexity, because the multiplications used in the filtering of a ternary signal involves only multiplications with +1, 0 or −1, which can easily be performed.

BRIEF DESCRIPTION OF THE DRAWINGS

The invention will now be explained with reference to the drawings.

Herein shows

DETAILED DESCRIPTION OF THE PREFERRED EMBODIMENTS

Figure 1:
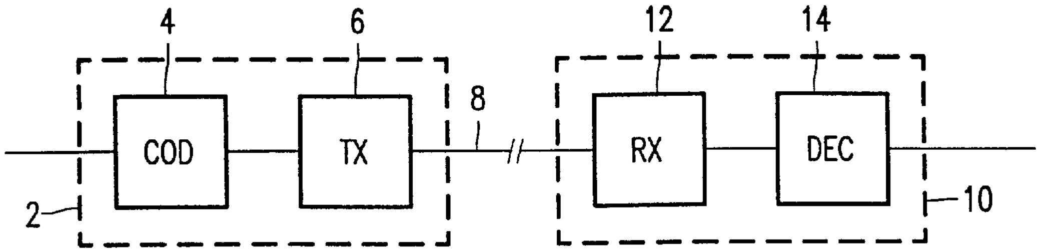
FIG. 1 (PRIOR ART)
FIG. 1, a transmission system in which the invention can be applied.

In the transmission system according to FIG. 1, the input signal is applied to a transmitter 2. In the transmitter 2, the input signal is encoded using an encoder according to the invention. The output signal of the encoder 4 is applied to an input of transmitting means 6 for transmitting the output signal of the encoder 4 via the transmission medium 8 to a receiver 10. The operation of the transmitting means can include modulation of the (binary) signals from the encoder, possibly in binary form on a carrier signal suitable for the transmission medium 8. In the receiver 10, the signal received is converted to a signal suitable for the decoder 14 by a front end 12. The operation of the front end 12 can include filtering, demodulation and detection of binary symbols. The decoder 14 derives a reconstructed input signal from the output signal from the front end 12.

Figure 2:
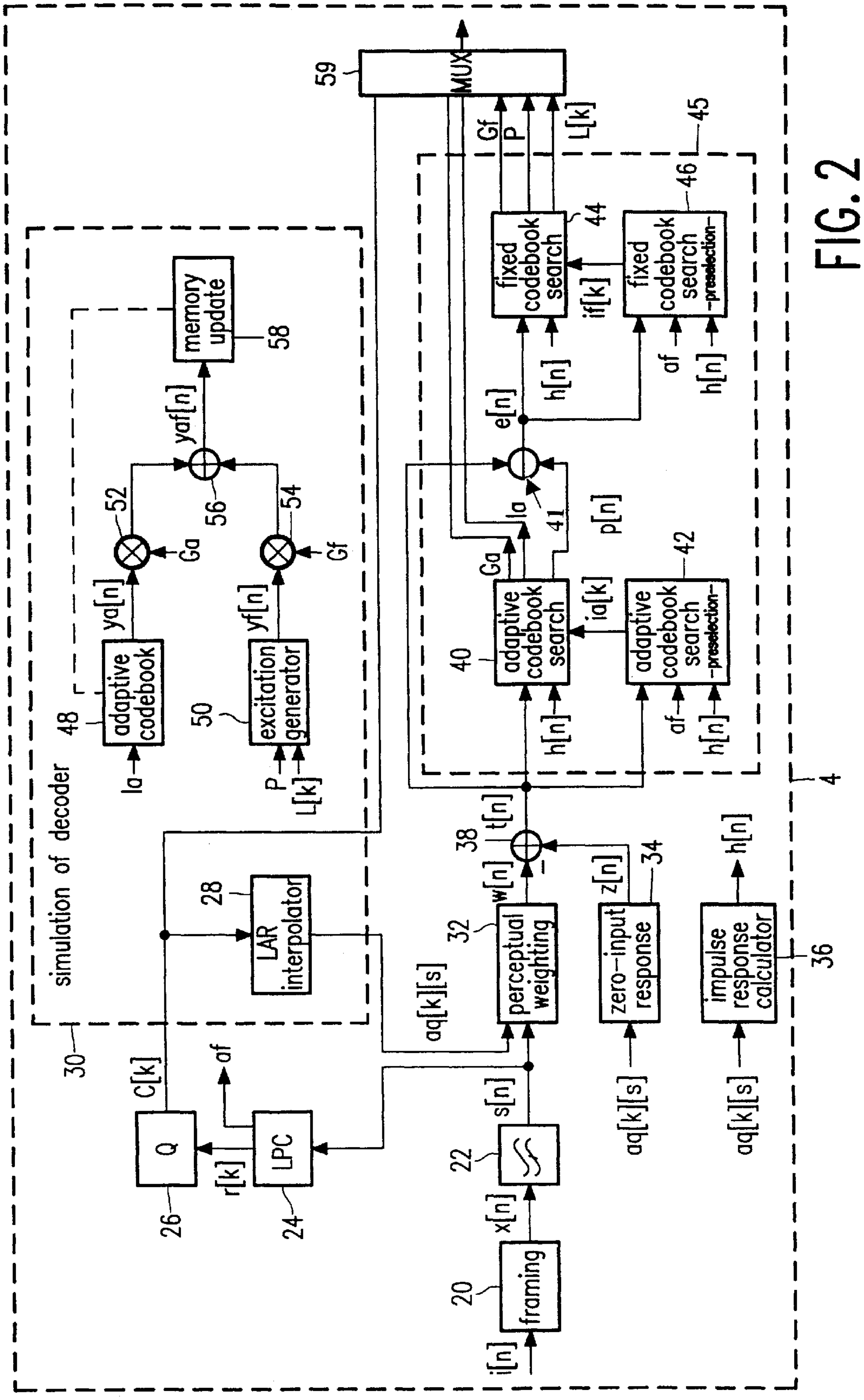
FIG. 2, an encoder according to the invention.

In the encoder according to FIG. 2, the input of the encoder 4 carrying samples i[n] of the digitised input signal is connected to an input of framing means 20. The output of the framing means, carrying an output signal x[n], is connected to a high pass filters 22. The output of the high pass filter 22, carrying an output signal s[n], is connected to a perceptual weighting filter 32, and to an input of a LPC analyzer 24. A first output of the LPC analyzer 24, carrying output signal r[k] is connected to a quantiser 26. A second output of the LPC analyzer carries a filter coefficient af for the reduced complexity synthesis filter.

The output of the quantiser 26, carrying the output signal C[k], is connected to an input of an interpolator 28, and to a first input of a multiplexer 59. The output of the interpolator 28, carrying the signal aq[k][s] is connected to a second input of the perceptual weighting filter 32, to an input of a zero input response filter 34, and to an input of an impulse response calculator 36. The output of the perceptual weighting filter 32, carrying the signal w[n], is connected to a first input of a subtracter 38. The output of the zero input response filter 34, carrying output signal z[n] is connected to a second input of the subtracter 38.

The output of the subtracter 38, carrying a target signal t[n] is connected to an input of adaptive codebook selection means 40, adaptive codebook preselection means 42, and to an input of a subtracter 41. The output of the impulse response calculator 36, carrying output signal h[n] is connected to an input of the adaptive codebook selection means 40, an input of the adaptive codebook preselection means 42, an input of fixed codebook selection means 44 and an input of excitation signal selection means further to be referred to as fixed codebook preselection means 46. An output of the adaptive codebook preselection means 42, carrying output signal ia[k] is connected to an input of the adaptive codebook 30 selection means 40. The combination of the adaptive codebook preselection means 42, the adaptive codebook selection means 40, the fixed codebook preselection means 46 and the fixed codebook selection means 44 form the selection means 45.

A first output of the adaptive codebook selection means, carrying output signal Ga, is connected to a second input of the multiplexer 59, and to a first input of a multiplier 52. A second output of the adaptive codebook selection means, carrying output signal Ia, is connected to a third input of the multiplexer 59 and to an input of an adaptive codebook 48. A third output of the adaptive codebook selection means 40, carrying output signal p[n], is connected a second input of the subtracter 41.

The output of the subtracter 41 carrying output signal e[n], is connected to a second input of the fixed codebook selection means 44 and to a second input of fixed codebook preselection means 46. An output of the fixed codebook preselection means 46, carrying output signal if[k], is connected to a third input of the fixed codebook selection means 44. A first output of the fixed codebook selection means, carrying output signal Gf, is connected to a first input of a multiplier 54 and to a fourth input of the multiplexer 59. A second output of the fixed codebook selection means 44, carrying output signal P, is connected to a first input of an excitation generator 50 and to a fifth input of the multiplexer 59. A third output of the fixed codebook selection means 44, carrying output signal L[k], is connected to a second input of the excitation generator 50 and to a sixth input of the multiplexer 59. An output of the excitation generator 50, carrying output signal yf[n], is connected to a second input of the multiplier 54. An output of the adaptive codebook 48, carrying output signal ya[n] is connected to a second input of the multiplier 52. An output of the multiplier 52 is connected to a first input of an adder 56. An output of the multiplier 54 is connected to a second input of the adder 56. An output of the adder 56, carrying output signal yaf[n] is connected to a memory update unit 58, the latter being coupled to the adaptive codebook 48.

An output of the multiplexer 59 constitutes the output of the encoder 59.

The embodiment of the encoder according to FIG. 2 is explained under the assumption that the input signal is a wide band speech signal with a frequency range from 0–7 kHz. A sampling rate of 16 kHz is assumed. However it is observed that the present invention is not limited to such type of signals.

In the framing means 20 the speech signal i[n] is divided into sequences of N signal samples x[n], also called frames. The duration of such a frame is typically 10–30 mS. By means of the high pass filter 22 the DC content of the framed signal is removed such that a DC free signal is available at the output of the high pass filter 22. By means of the linear predictive analyzer 24, K linear prediction coefficients a[k] are determined. K is typically between 8 and 12 for narrow band speech and between 16 to 20 for wideband speech, however exceptions to this typical value are possible. The linear predictive coefficients are used in the synthesis filter to be explained later.

For the calculation of the prediction coefficients a[k] first the signal s[n] is weighted with a Hamming window to obtain the weighted signal sw[n]. The prediction coefficients a[n] are derived from the signal sw[n] by first calculating autocorrelation coefficients and subsequently performing the Levinson-Durbin algorithm for recursively determining the values a[k]. The result of the first recursion step is stored as af for use in the reduced complexity synthesis filter. Alternatively it is possible to store the results af1 and af2 of the second recursion step as parameters for the reduced complexity synthesis filter. It is observed that if a second order reduced complexity synthesis filter is used, it may be possible to perform only the preselection. A selection using a full complexity synthesis filter can then be dispensed with. To eliminate extremely sharp peaks in the spectral envelope represented by the prediction parameters a[k], a bandwidth expansion operation is performed by multiplying each coefficient a[k] with a value $\gamma^k$. The modified prediction coefficients ab[k] are transformed into log area ratios r[k].

The quantiser 26 quantises the log area ratios in a non-uniform way in order to reduce the number of bits to be used for transmitting the log area ratios to the receiver. The quantiser 26 generates a signal C[k] indicating the quantisation level of the log area ratios.

For the selection of the optimum excitation sequence for the synthesis filter the frames s[n] are subdivided in S subframes. In order to achieve smooth filter transitions the interpolator 28 performs linear interpolation between the current indices C[k] and the previous ones Cp[k] for each sub frame, and converts the corresponding log area ratios back into prediction parameters aq[k][s]. s is equal to the index of the current sub frame.

In an analysis by synthesis encoder, a frame (or sub frame) of the speech signal is compared with a plurality of synthetic speech frames each corresponding to a different excitation sequence filtered by a synthesis filter. The transfer function of the synthesis filter is equal to 1/A(z) with A(z) being equal to $$A(z) = 1 - \sum_{k=0}^{P-1} aq[k]\,[s] \cdot z^{-k-1} \tag{1}$$

In (1) P is the prediction order, k is a running index, and $z^{-1}$ is the unity delay operator.

In order to deal with the perceptual properties of the human auditory system the difference between the speech frame and the synthetic speech frame is filtered by a perceptual weighting filter with transfer function $A(z)/A(z/\gamma)$. $\gamma$ is a constant normally having a value around 0.8 The optimum excitation signal selected is the excitation signal that results in a minimum power of the output signal of the perceptual weighting filter.

In the most speech coders the perceptual weighting filtering operation is performed before the comparison operation. This means that the speech signal has to be filtered by a filter with transfer function $A(z)/A(z/\gamma)$ and that the synthesis filter has to be replaced by a modified synthesis filter with transfer function $1/A(z/\gamma)$. It is observed that also other types of perceptually weighting filters are in use, such as the one with transfer function $A(z/\gamma_1)/A(z/\gamma_2)$ The perceptual weighting filter 32 performs the filtering of the speech signal according to the transfer function $A(z)/A(z/\gamma)$ as discussed above. The parameters of the perceptual weighting filter 32 are updated each subframe with the interpolated prediction parameters aq[k][s]. It is observed that the scope of the present invention includes all variants of the transfer function of the perceptual weighting filter and all positions of the perceptual weighting filter.

The output signal of the modified synthesis filter is also dependent on the selected excitation sequences from previous subframes. The parts of the synthetic speech signal dependent on the current excitation sequence and the previous excitation sequences can be separated. Because the output signal of the zero input filter is independent of the current excitation sequence, it can be moved to the speech signal path as is done with the filter 34 in FIG. 2.

Because the output signal of the modified synthesis filter is subtracted from the perceptually weighted speech signal, the signal of the zero input response filter 34 has also to be subtracted from the perceptually weighted speech signal. This subtraction is performed by the subtracter 38. At the output of the subtracter 38 the target signal t[n] is available.

The encoder 4 comprises a local decoder 30. The local decoder 30 comprises an adaptive codebook 48 which stores subsequently a plurality of previously selected excitation sequences. The adaptive codebook 48 is addressed with the adaptive codebook index Ia. The output signal ya[n] of the adaptive codebook 48 is scaled with a gain factor Ga by the multiplier The local decoder 30 comprises also an excitation generator 50 which is arranged for generating a plurality of predetermined excitation sequences. The excitation sequence yf[n] is a so-called regular pulse excitation sequence. It comprises a plurality of excitation samples separated by a number of samples with zero value. The position of the excitation samples is indicated by the parameter PH (phase). The excitation samples can have one of the values −1,0 and +1. The values of the excitation samples is given by the variable L[k]. The output signal yf[n] of the excitation generator 50 is scaled with a gain factor Gf by the multiplier 54. The output signals of the multipliers 52 and 54 are added by the adder 56 to an excitation signal yaf[n]. This signal yaf[n] is stored in the adaptive codebook 48 for use in the next subframe.

In the adaptive codebook preselection means 42 a reduced set of excitation sequences is determined. The indices ia[k] of these sequences is passed to the adaptive codebook selection means 40. In the adaptive codebook preselection means 42 a first order reduced complexity synthesis filter is used according to the invention. Further not all possible excitation sequences are taken into account, but a reduced number of excitation sequences having a mutual displacement of at least two positions. A good choice is a displacement in the range from 2 to 5. The reduction of the complexity of the synthesis filter used and the reduction of the number of excitation sequences taken into account gives a substantial reduction of the complexity of the encoder.

The adaptive codebook selection means 40 are arranged for deriving from the preselected excitation sequences the best excitation sequence. In this selection a full complexity synthesis filter is used, and a small number of excitation sequences in the vicinity of the preselected excitation sequences is tried. The displacement between the tried excitation sequences is smaller than the displacement used in the preselection. A displacement of one is used in an encoder according to the invention. Due to the small number of excitation sequences involved, the additional complexity of the final selection is low. The adaptive codebook selection means generate also a signal p[n] which is a synthetic signal obtained by filtering the stored excitation sequences by the weighted synthesis filter and by multiplying the synthetic signal with the value Ga.

The subtracter 41 subtracts the signal p[n] from the target signal t[n] to derive the difference signal e[n]. In the fixed codebook preselection means 46 a backward filtered target signal tf[n] is derived from the signal e[n]. From the possible excitation sequences, the excitation sequences resembling the most the filtered target signal are preselected, and their indices if[k] are passed to the fixed codebook selection means 46. The fixed codebook selection means 44 perform a search of the optimal excitation signal from those preselected by the fixed codebook preselection means 46. In this search a full complexity synthesis filter is used. The signals C[k], Ga, Ia, Gf, PH and L[k] are multiplexed to a single output stream by the multiplexer 59.

The impulse response values h[n] are calculated by the impulse response calculator 36 from the prediction parameters aq[k][s] according to the recursion:

$$h[n]=0;\ n<0$$

$$h[n]=1;\ n=0 \quad (2)$$

$$h[n]=\sum_{i=0}^{P-1} h[n-1-i]\cdot aq[i]\ [s]\gamma^{i+1};\ 1\leq n<Nm \quad (2)$$

In (2) Nm is the required length of the impulse response. In the present system this length is equal to the number of samples in a subframe.

Figure 3:
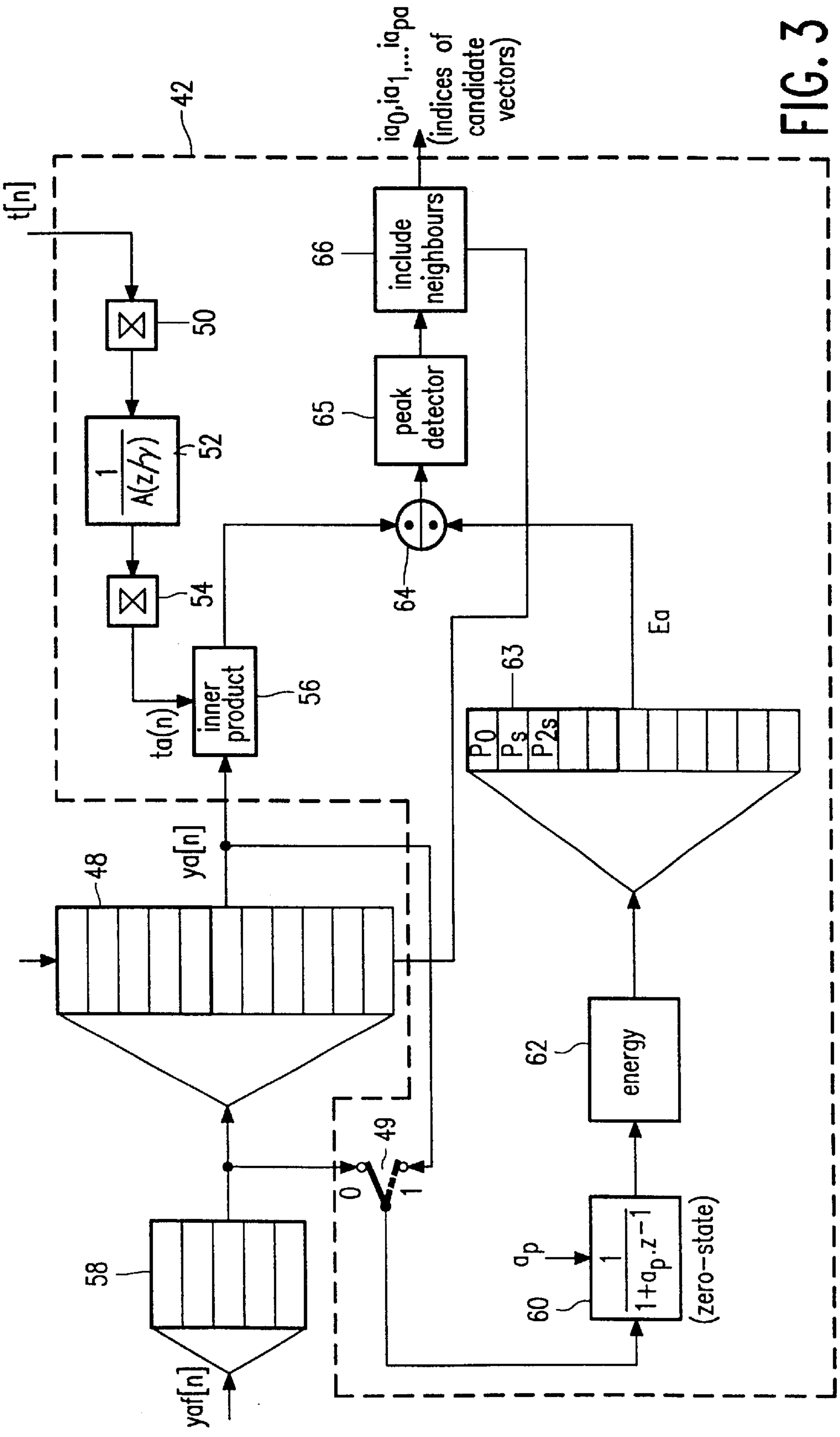
FIG. 3, a part of the adaptive codebook selection means for preselecting a plurality of excitation sequences from the main sequence.

In the adaptive codebook preselection means 42 according to FIG. 3, the target signal t[n] is applied to an input of a time reverser 50. The output of the time reverser 50 is connected to an input of a zero state filter 52. The output of the zero state filter 52 is connected to an input of a time reverser 54. The output of the time reverser 54 is connected to a first input of a cross correlator 56. An output of the cross correlator 56 is connected to a first input of a divider 64.

An output of the adaptive codebook 48 is connected to a second input of the cross correlator 56 and, via a selection switch 49, to an input of a reduced complexity zero state synthesis filter 60. A further terminal of the selection switch is also connected to an output of the memory update unit 58. The output of the reduced complexity synthesis filter 60 is connected to an input of an energy estimator 62. An output of the energy estimator 62 is connected to an input of an energy table 63. An output of the energy table 63 is connected to a second input of the divider 64. The output of the divider 64 is connected to an input of a peak detector 65, and the output of the peak detector 65 is connected to an input of a selector 66. A first output of the selector 66 is connected to an input of the adaptive codebook 48 for selecting different excitation sequences. A second output of the selector 66 carrying a signal indicating the preselected excitation sequence from the adaptive codebook is connected to a selection input of the adaptive codebook 48 and to a selection input of the energy table 63.

The adaptive codebook preselection means 42 are arranged for selecting the excitation sequence from the adaptive codebook and the corresponding gain factor ga. This operation can be written as minimising the error signal E being equal to:

$$\mathcal{E}=\sum_{n=0}^{Nm-1}(t[n]-ga\cdot y[l]\,[n])^2 \quad (3)$$

In (3) Nm is the number of samples in a subframe, y[1][n] is the response of the zero-state synthesis filter on the excitation sequence ca[1][n]. By differentiating (3) with respect to ga and stating the derivative equal to zero for the optimal value of ga can be found:

$$ga=\frac{\sum_{n=0}^{Nm-1} t[n]\cdot y[l]\,[n]}{\sum_{n=0}^{Nm-1} y^2[l]\,[n]} \quad (4)$$

Substituting (4) into (3) gives for E:

$$\mathcal{E}=\sum_{n=0}^{Nm-1} t^2[n]-\frac{\left[\sum_{n=0}^{Nm-1} t[n]\cdot y[l]\,[n]\right]^2}{\sum_{n=0}^{Nm-1} y^2[l]\,[n]} \quad (5)$$

Minimising E corresponds to maximising the second term f[1] in (5) over 1. f[1] can also be written as:

$$f[l]=\frac{\left[\sum_{n=0}^{Nm-1} t[n]\cdot y[l]\,[n]\right]^2}{\sum_{n=0}^{Nm-1} y^2[l]\,[n]}=\frac{\left[\sum_{n=0}^{Nm-1} t[n]\cdot\left(\sum_{i=0}^{Nm-1} ca[l]\,[i]\cdot h[n-i]\right)\right]^2}{\sum_{n=0}^{Nm-1} y^2[l]\,[n]} \quad (6)$$

In (6) h[n] is the impulse response of the filter 52 in FIG. 3, as calculated according to (2). (6) can also be written as:

$$f[l]=\frac{\left[\sum_{i=0}^{Nm-1} ca[l]\,[i]\cdot\left(\sum_{n=0}^{Nm-1} t[n]\cdot h[n-i]\right)\right]^2}{\sum_{n=0}^{Nm-1} y^2[l]\,[n]}=\frac{\left[\sum_{i=0}^{Nm-1} ca[l]\,[i]\cdot ta\,[i]\right]^2}{\sum_{n=0}^{Nm-1} y^2[l]\,[n]} \quad (7)$$

(7) is used in the preselection of the adaptive codebook. The advantage of using (7) is that for determining the numerator of (7) only one filter operation is required for all codebook entries. Using (6) would require one filter operation for each codebook entry involved in the preselection. For determining the denominator of (7), whose calculation still requires filtering all codebook entries, a reduced complexity synthesis filter is used.

The denominator Ea of f[1] is the energy of the excitation sequences involved filtered with the reduced complexity synthesis filter 60. Experiments have shown that the single filter coefficient varies rather slowly, so it has to be updated only once per frame. It is also possible to calculate the energy of the excitation sequences only once per frame, but this requires a slightly modified selection procedure. For preselecting the excitation sequences from the adaptive codebook the measure rap[i·Lm+l] derived from (7) is calculated according to:

$$rap[i\cdot Lm+L]=\frac{\left[\sum_{n=0}^{Nm-1} ca[Lmin+i\cdot Lm+l\cdot Sa-n]\cdot ta\,[n]\right]^2}{Ea[i\cdot Lm+l]} \quad (8)$$

In (8) i and l are running parameters, ]Lmin is the minimum possible pitch period of the speech signal being considered, Nm is the number of samples per subframe, Sa is the displacement between subsequent excitation sequences, and Lm is a constant defining the number of energy values stored per subframe, which is equal to 1+⌊(Nm−1)/Sa. The search according to (8) is performed for 0≦l<Lm and 0≦i<S. The search is arranged to include always the first codebook entry corresponding to the beginning of an excitation sequence previously written in the adaptive codebook 48. This allows the reuse of previously calculated energy values Ea stored in the energy table 63.

At the instance for updating the adaptive codebook 48, the selected excitation signal yaf[n] of the previous subframe is present in the memory update unit 58. The selection switch 49 is in the position 0, and the newly available excitation sequences are filtered by the reduced complexity synthesis filter 60. The energy values of the new filtered excitation sequences are stored in Lm memory positions. The energy values already present in the memory 63 are shifted downward. The oldest Lm energy values are shifted out from the memory 63, because the corresponding excitation sequences are not present any more in the adaptive codebook. The target signal ta[n] is calculated by the combination of the time reverser 50 the filter 52 and the time reverser 54. The correlator 56 calculates the numerator of (8), and the divider 64 performs the division from the numerator of (8) by the denominator of (8). The peak detector 65 determines the indices of the codebook indices giving the Pa largest values of (8). The selector 66 adds the indices of the neighbouring excitation sequences of the Pa sequences found by the peak selector 56 and passes all these indices to the adaptive codebook selector 40.

In the middle of the frame (after S/2 subframes have passed) the value of af is updated. Subsequently the selection switch is put in position 1 and all energy values corresponding to the excitation sequences involved with the adaptive codebook preselections are recalculated and stored in the memory 63.

Figure 4:
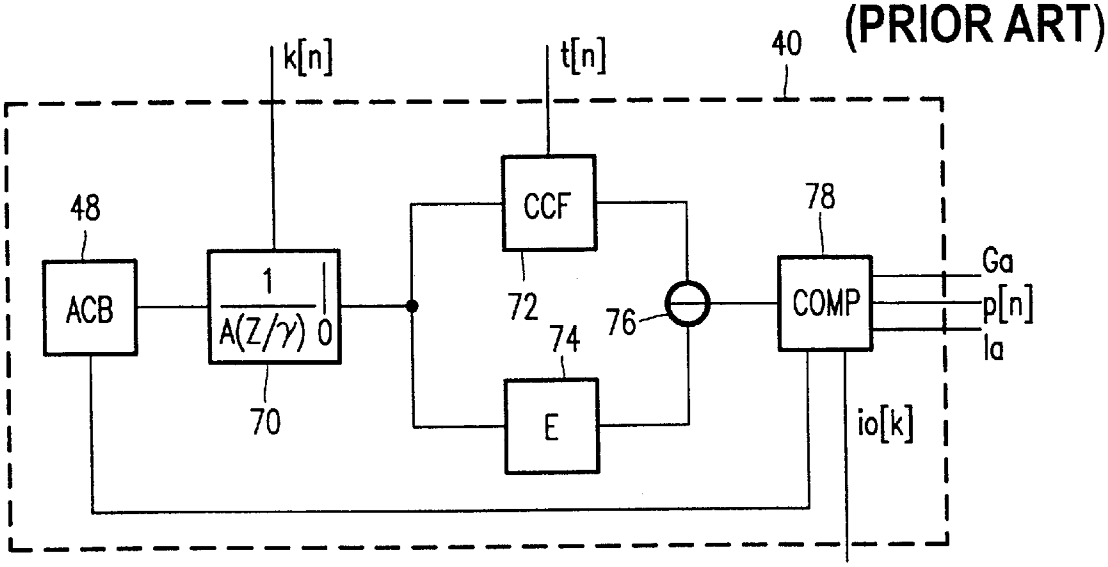
FIG. 4, a part of the selection means for selecting the at least one further excitation sequence.

In the adaptive codebook selector 40 according to FIG. 4, an output of the adaptive codebook 48 is connected to an output of the (full complexity) zero state synthesis filter 70. The synthesis filter 70 receives its impulse response parameter from the calculator 36. The output of the synthesis filter 70 is connected to an input of a correlator 72 and to an input of an energy estimator 74. The target signal t[n] is applied to a second input of the correlator 72. An output of the correlator 72 is connected to a first input of a divider 76. An output of the energy estimator 74 is connected to a second input of the divider 76. The output of the divider 76 is connected to a first input of a selector 78. The indices ia[k] of the preselected excitation sequences are applied to a second input of the selector 78. A first output of the selector is connected to a selection input of the adaptive codebook 48. Two further outputs of the selector 78 provide the output signals Ga and Ia.

The selection of the optimum excitation sequence corresponds to maximising the term ra[r]. Said term ra[r] is equal to:

$$ra[r] = \frac{\left[\sum_{n=0}^{Nm-1} t[n]\cdot y[r][n]\right]^2}{\sum_{n=0}^{Nm-1} y^2[r][n]} \tag{9}$$

(9) corresponds to the term f[l] in (5). The signal y[r][n] is derived from the excitation sequences by the filter 70. The initial states of the filter 70 are set to zero each time before an excitation sequence is filtered. It is assumed that the variable ia[r] contains the indices of the preselected excitation sequences and their neighbours in increasing index order. This means that ia[r] contains Pa subsequent groups of indices, each of these groups comprising Sa consecutive indices of the adaptive codebook. For the codebook entry with the first index of a group, y[r·Sa][n] is calculated according to:

$$y[r\cdot Sa][n] = \sum_{l=0}^{n} h[n-1]\cdot ca[ia[r\cdot Sa]-l]; \quad 0\le N < Nm \tag{10}$$

Because the same excitation samples but one are involved with the calculation of y[r·Sa+1][n], the value y[r·Sa+1][n] can be determined recursively from y[r·Sa][n]. This recursion can be applied for all excitation sequences having an index in one group. For the recursion can be written in general:

$$y[r\cdot Sa+i+1][n]=y[r\cdot Sa+i][n-1]+h[n]\cdot ca[ia[r\cdot Sa+i+1]] \tag{11}$$

The correlator 72 determines the numerator of (9) from the output signal of the filter 70 and the target signal t[n]. The energy estimator 74 determines the denominator of (9). At the output of the divider the value of (9) is available. The selector 78 causes (9) to be calculated for all preselected indices and stores the optimum index Ia of the adaptive codebook 48. Subsequently the selector calculates the gain value g according to:

$$g = \frac{\sum_{n=0}^{Nm-1} t[n]\cdot \tilde{y}[n]}{\sum_{n=0}^{Nm-1} \tilde{y}^2[n]} \tag{12}$$

In (12) $\tilde{y}$ is the response of the filter 70 to the selected excitation sequence with index Ia. The gain factor g is quantised by a non uniform quantisation operation to the quantised gain factor Ga which is presented at the output of the selector 78. The selector 78 also outputs the contribution p[n] of the adaptive codebook to the synthetic signal according to:

$$p[n]=Ga\cdot\tilde{y}[n] \tag{13}$$

Figure 5:
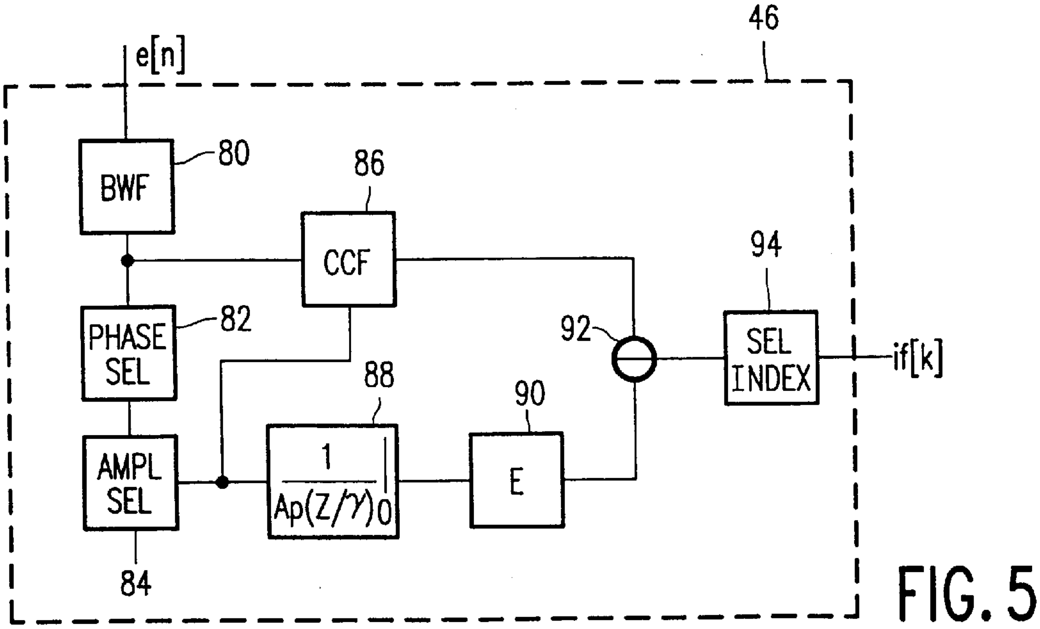
FIG. 5, excitation sequence selection means according to the invention.

In the fixed codebook preselection means according to FIG. 5, the signal e[n] is applied to an input of a backward filter 80. The output of the backward filter 80 is connected to a first input of a correlator 86 and to an input of a phase selector 82. The output of the phase selector is connected to an input of an amplitude selector 84. The output of the amplitude selector 84 is connected to a second input of the correlator 86 and to an input of a reduced complexity synthesis filter 88. The output of the reduced complexity synthesis filter 88 is connected to an input of an energy estimator 90.

The output of the correlator 86 is connected to a first input of divider 92. The output of the energy estimator 90 is connected to a second input of the divider 92. The output of the divider 92 is connected to an input of a selector 94. At the output of the selector the indices if[k] of the preselected excitation sequences of the fixed codebook are available.

The backward filter 80 calculates from the signal e[n] a backward filtered signal tf[n]. The operation of the backward filter is the same as that described in relation to the backward filtering operation in the adaptive codebook preselection means 42 according to FIG. 3. The fixed codebook is arranged as a so called ternary RPE codebook (Regular Pulse Excitation) i.e. a codebook comprising a plurality of equidistant pulses separated with a predetermined number of zero values. The ternary RPE codebook has Nm pulses of which Np pulses may have an amplitude of +1, 0 or −1. These Np pulses are positioned on a regular grid defined by the phase PH and the pulse spacing D with $0 \leqq PH < D$. The grid positions pos are given by PH+D·l, with $0 \leqq l < Np$. The leaving Nm-Np pulses are zero. The ternary RPE codebook as defined above has D $(3^{N_P}-1)$ entries. To reduce complexity a local RPE codebook containing a subset of Nf entries is generated for each subframe. All excitation sequences of this local RPE codebook have the same phase PH which is determined by the phase selector 82 by searching over the interval $0 \leqq PH < D$ the value of PH which maximises the expression:

$$\sum_{l=0}^{Np-1} |tf\,[PH + D \cdot l]| \tag{14}$$

In the amplitude selector 84 two arrays are filled. The first array, amp contains the variables amp[l] being equal to sign(tf[PH+D·l]) in which sign is the signum function. The second array, pos[l] contains a flag indicating the Nz largest values of |tf[PH+D·l]|. For these values the excitation pulses are not allowed to have a zero value. Subsequently a two dimensional array cf[k][n] is filled with Nf excitation sequences having phase PH and having sample values which fulfil the requirements imposed by the content of the arrays amp and pos respectively. These excitation sequences are the excitation sequences having the largest resemblance to the residual sequence, being here represented by the backward filtered signal tf[n].

The selection of the candidate excitation sequence is based on the same principle as is used in the adaptive codebook preselection means 42. The correlator 86 calculated the correlation value between the backward filtered signal tf[n] and the preselected excitation sequences. The (reduced complexity) synthesis filter 88 is arranged for filtering the excitation sequences, and the energy estimator 90 calculates the energy of the filtered excitation sequences. The divider divides the correlation value by the energy corresponding to the excitation sequence. The selector 94 selects the excitation sequences corresponding to the Pf largest values of the output signal of the divider 92, and stores the corresponding indices of the candidate excitation sequences in an array if[k].

Figure 6:
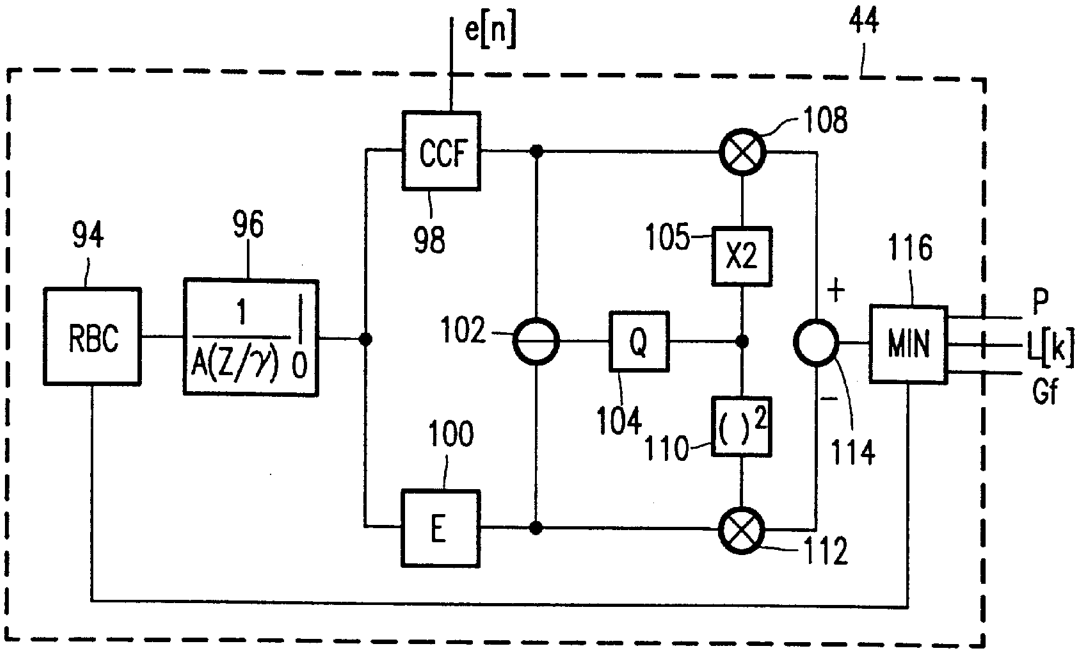
FIG. 6, fixed codebook selection means according to the invention.

In the fixed codebook selection means 44 according to FIG. 6, an output of the reduced codebook 94 is connected to an input of a synthesis filter 96. The output of the synthesis filter 96 is connected to a first input of a correlator 98 and to an input of an energy estimator 100. The signal e[n] is applied to a second input of the correlator 98. The output of the correlator 98 is connected to a first input of a multiplier 108 and to a first input of a divider 102. The output of the energy estimator 100 is connected to a second input of the divider 102 and to an input of a multiplier 112. The output of the divider 102 is connected to an input of a quantiser 104. The output of the quantiser 104 is connected to an input of a multiplier 105 and a squarer 110.

The output of the multiplier 105 is connected to a second input of the multiplier 108. The output of the squarer 110 is connected to a second input of the multiplier 112. The output of the multiplier 108 is connected to a first input of a subtracter 114, and the output of the multiplier 112 is connected to a second input of the subtracter 114. The output of the subtracter 114 is connected to an input of a selector 116. A first output of the selector 116 is connected to a selection input of the reduced codebook 94. Three outputs of the selector 116 with output signals P, L[k] and Gf present the final results of the fixed codebook search.

In the fixed codebook selection means 44 a closed loop search for the optimal excitation sequence is performed. The search involves determining the index r for which the expression rf[r] is maximal. rf[r] is equal to:

$$rf\,[r] = 2 \cdot Gf \cdot \sum_{n=0}^{Nm-1} e\,[n] \cdot y\,[r]\,[n] - Gf^2 \cdot \sum_{n=0}^{Nm-1} y^2[r]\,[n] \tag{15}$$

In (15) y[r][n] is the filtered excitation sequence and Gf is the quantised version of the optimal gain factor g being equal to $$g = \frac{\sum_{n=0}^{Nm-1} e\,[n] \cdot y\,[r]\,[n]}{\sum_{n=0}^{Nm-1} y^2[r]\,[n]} \tag{16}$$

(15) is obtained by expanding the expression for E, deleting the terms not depending on r and replacing the optimal gain g by the quantised gain Gf. The signal y[r][n] can be calculated according to:

$$y\,[r]\,[n] = \sum_{j=0}^{n} h\,[n-j] \cdot cf\,[if\,[r]]\,[j];\ 0 \leq n < Nm \tag{17}$$

Because cf[if[r]][j]can only have non-zero values for j=P+D·l($0 \leqq l < Np$) (17) can be simplified to:

$$y\,[r]\,[n] = \sum_{l=0}^{\frac{n-P}{D}} h\,[n - P - D \cdot l] \cdot cf\,[r]\,[P + D \cdot l] \tag{18}$$

The determination of (18) is performed by the filter 96. The numerator of (15) is determined by the correlator 98 and the denominator of (15) is calculated by the energy estimator 100. The value of g is available at the output of the divider 102. The value of g is quantised to Gf by the quantiser 104. At the output of the multiplier 108 the first term of (15) is available, and at the output of the multiplier 112 the second term of (15) is available. The expression rf[r] is available at the output of the subtracter 114. The selector 116 selects the value of r maximising (15), and presents at its outputs the gain Gf, the amplitude L[k] of the non-zero excitation pulses, and the optimal phase PH of the excitation sequence.

Figure 7:
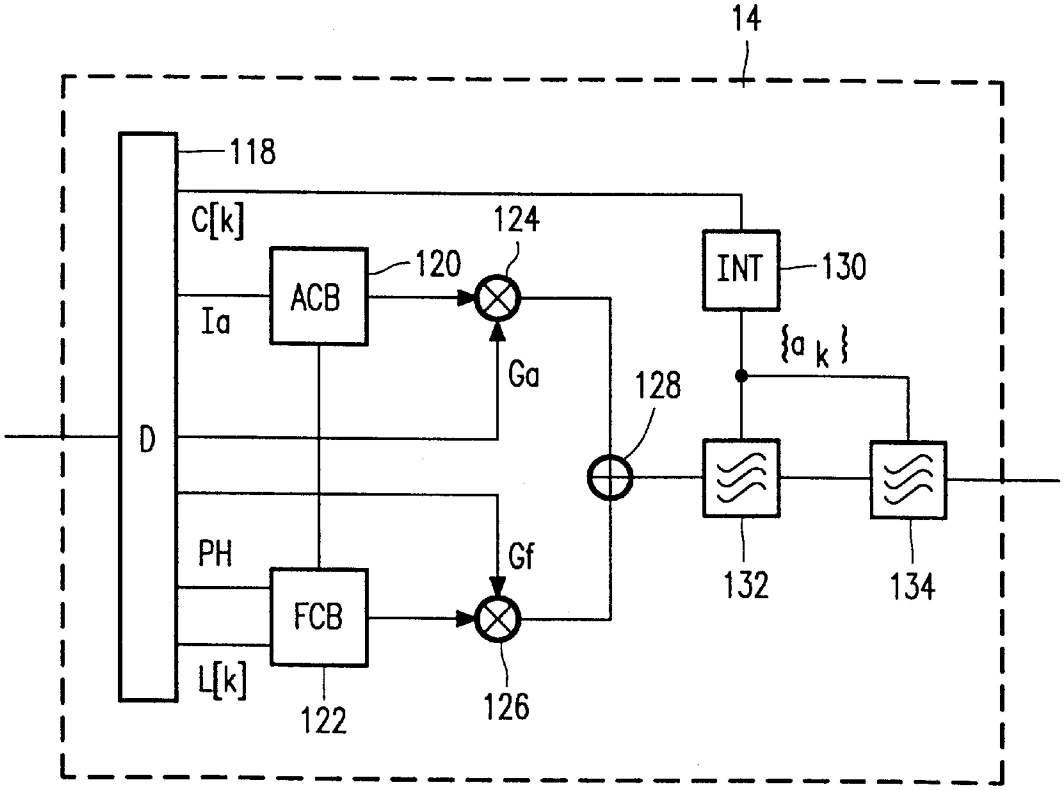
FIG. 7, a decoder to be used in the transmission system according to FIG. 1.

The input signal of the decoder 14 according to FIG. 7, is applied to an input of a demultiplexer 118. A first output of the demultiplexer 118 carrying the signal C[k] is connected to an input of an interpolator 130. A second output of the demultiplexer 118 carrying the signal Ia is connected to an input of an adaptive codebook 120. An output of the adaptive codebook 120 is connected to a first input of a multiplier 124. A third output of the demultiplexer 118 carrying the signal Ga is connected to a second input of the multiplier 124. A fourth output of the demultiplexer 118 carrying the signal Gf is connected to a first input of a multiplier 126. A fifth output of the demultiplexer 118 carrying the signal PH is connected to a first input of an excitation generator 122. A sixth output of the demultiplexer 118 carrying the signal L[k] is connected to a second input of the excitation generator 122. An output of the excitation generator is connected to a second input of the multiplier 126. An output of the multiplier 124 is connected to a first input of an adder 128, and the output of the multiplier 126 is connected to a second input of the adder 128.

The output of the adder 128 is connected to a first input of a synthesis filter 132. An output of the synthesis filter is connected to a first input of a post filter 134. An output of the interpolator 130 is connected to a second input of the synthesis filter 132 and to a second input of the post filter 134. The decoded output signal is available at the output of the post filter 134.

The adaptive codebook 120, generates an excitation sequence according to index Ia for each subframe. Said excitation signal is scaled with the gain factor Ga by the multiplier 124. The excitation generator 122 generates an excitation sequence according to the phase PH and the amplitude values L[k] for each subframe. The excitation signal from the excitation generator 122 is scaled with the gain factor Gf by the multiplier 126. The output signals of the multipliers 124 and 126 are added by the adder 128 to obtain the complete excitation signal. This excitation signal is fed back to the adaptive codebook 120 for adapting the content of it. The synthesis filter 132 derives a synthetic speech signal from the excitation signal at the output of the adder 128 under control of the interpolated prediction parameters aq[k][s] which are updated each subframe. The interpolated prediction parameters aq[k][s] are derived by interpolation of the parameters C[k] and conversion of the interpolated C[k] parameters to prediction parameters. The post filter 134 is used to enhance the perceptual quality of the speech signal. It has a transfer function equal to:

$$F(z) = G[s] \cdot \frac{1 - \sum_{i=0}^{P-1} 0.65^{i+1} \cdot aq[i][s] \cdot z^{-(i+1)}}{1 - \sum_{i=0}^{P-1} 0.75^{i+1} \cdot aq[i][s] \cdot z^{-(i+1)}} \cdot (1 - 0.3 \cdot z^{-1}) \tag{19}$$

In (19) G[s] is a gain factor for compensating the varying attenuation of the filter function of the post filter 134.

What is claimed is:

1. A transmission system comprising a. a transmitter (2) for transmitting an input signal to a receiver (10) via a transmission channel (8), the transmitter (2) comprising an encoder (4) with I. sequence selection means (46) having i. an analysis filter (80) for deriving, from a target signal derived from the input signal, a residual sequence, ii. an excitation sequence generator (82, 84) for generating a plurality of X excitation sequences comprising non zero sample values being separated by a predetermined number of zero sample values, the generator including a phase selector (82) for determining from the residual sequence the position of the non-zero sample values in the plurality of excitation sequences, iii. a second selector (94) for preselecting, from the plurality of excitation sequences, a second plurality of excitation sequences having the largest resemblance with the residual sequence, and II. selection means (44) for selecting a selected excitation sequence from the second plurality of excitation sequences, the selected excitation sequence resulting in a minimum error between A. a synthetic signal derived from said selected excitation sequence and B. the target signal derived from the input signal, the transmitter (2) being arranged for transmitting a signal representing the selected excitation sequence to the receiver (10), and b. the receiver (10) comprising i. decoder (14) with an excitation sequence generator (122) for deriving the selected excitation sequence from the signal representing the selected excitation sequence ii. a synthesis filter (132) for deriving an output signal from the excitation sequence.

2. The transmission system according to claim 1, characterised in that the excitation sequences comprises ternary excitation samples, in that the selected means are arranged for selecting the excitation sequences of which the sign of the signal samples does not differ from the sign of the corresponding samples in the residual sequence.

3. The transmission system according to claim 1, characterised in that the excitation sequences comprises ternary excitation samples, and in that selection means are arranged for selecting the excitation sequences of which the sign of the signal samples correspond to the sign of the N largest samples from the residual sequence, in which N is a positive integer.

4. The system of claim 1, wherein the encoder includes both an adaptive codebook selection means (40, 42) and a fixed codebook selection means (44, 46) and the residual sequence is derived as a backward filtered signal obtained by the fixed codebook selection means (44, 46) from the adaptive codebook selection means (40,42).

5. A transmitter (2) for transmitting an input signal, the transmitter (2) comprising an encoder (4) with I. sequence selection means (46) having a. an analysis filter (80) for deriving, from a target signal derived from the input signal, a residual sequence, b. an excitation sequence generator (82, 84) for generating a plurality of excitation sequences comprising non zero sample values being separated by a predetermined number of zero sample values, the generator including a phase selector (82) for determining from the residual sequence the position of the non-zero sample values in the plurality of excitation sequences c. a second selector (94) for preselecting, from the plurality of excitation sequences, a second plurality of excitation sequences having the largest resemblance with the residual sequence, and II. selection means (44) for selecting a selected excitation sequence from the second plurality of excitation sequences, the selected excitation sequence resulting in a minimum error between i. a synthetic signal derived from said selected excitation sequence and ii. the target signal derived from the input signal, the transmitter (2) being arranged for transmitting a signal representing the selected excitation sequence.

6. The transmitter of claim 5, wherein the encoder includes both an adaptive codebook selection means (40, 42) and a fixed codebook selection means (44, 46) and the residual sequence is derived as a backward filtered signal obtained by the fixed codebook selection means (44,46) from the adaptive codebook selection means (40,42).

7. An encoder (4) comprising

I. sequence selection means (46) having a. an analysis filter (80) for deriving, from a target signal derived from an input signal, a residual sequence, b. an excitation sequence generator (82, 84) for generating a first plurality of excitation sequences comprising non zero sample values being separated by a predetermined number of zero sample values, the generator including a phase selector (82) for determining from the residual sequence the position of the non-zero sample values in the plurality of excitation sequences, c. a second selector (94) for preselecting, from the first plurality of excitation sequences, a second plurality of excitation sequences having the largest resemblance with the residual sequence, and II. selection means (44) for selecting a selected excitation sequence from the second plurality of excitation sequences, the selected excitation sequence resulting in a minimum error between i. a synthetic signal derived from said selected excitation sequences and ii. the target signal derived from the input signal, the encoder (2) being arranged for outputting a signal representing the selected excitation sequence.

8. The encoder of claim 7, wherein the encoder includes both an adaptive codebook selection means (40, 42) and a fixed codebook selection means (44, 46) and the residual sequence is derived as a backward filtered signal obtained by the fixed codebook selection means (44, 46) from the adaptive codebook selection means (40,42).

9. A method for transmitting an input signal, the method comprising a. deriving, from a target signal derived from the input signal, a residual sequence according to an analysis filter operation, b. generating a first plurality of excitation sequences comprising non zero sample values being separated by a predetermined number of zero sample values, the generating including determining from the residual sequence the position of the non-zero sample values in the plurality of excitation sequences according to a phase selector operation, c. selecting, from the first plurality of excitation sequences, a second plurality of excitation sequences having the largest resemblance with the residual sequence, d. selecting a selected excitation sequence from the second plurality of excitation sequences, the selected excitation sequence resulting in a minimum error between i. a synthetic signal derived from said selected excitation sequence, and ii. the target signal derived from the input signal, and e. transmitting a signal representing the selected excitation sequence.

* * * * *